May 28, 1940.     H. SCHEDEL     2,202,469
ELECTRIC DISCHARGE VESSEL
Filed Aug. 10, 1937     2 Sheets-Sheet 1
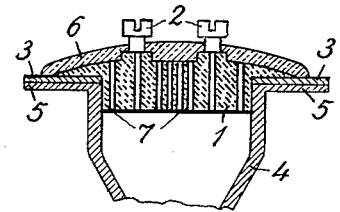
Fig. 1
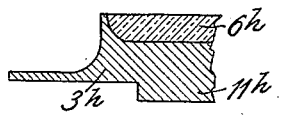
Fig. 6
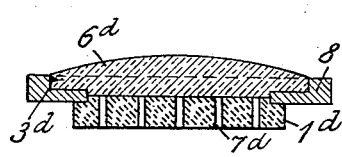
Fig. 2
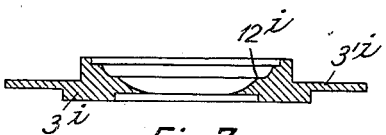
Fig. 7
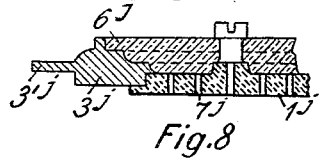
Fig. 8
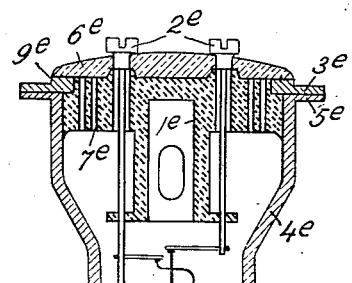
Fig. 3
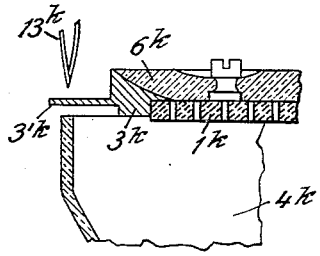
Fig. 9
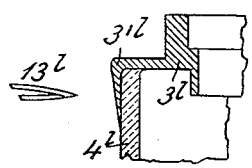
Fig. 10
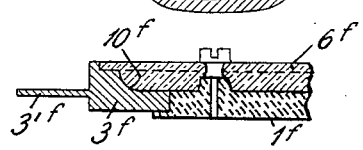
Fig. 4
Fig. 11
Inventor:
Hans Schedel
by R.C. Hopgood
Attorney May 28, 1940.　　　　H. SCHEDEL　　　　2,202,469
ELECTRIC DISCHARGE VESSEL
Filed Aug. 10, 1937　　　　2 Sheets-Sheet 2
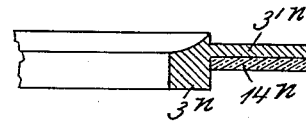
Fig. 12
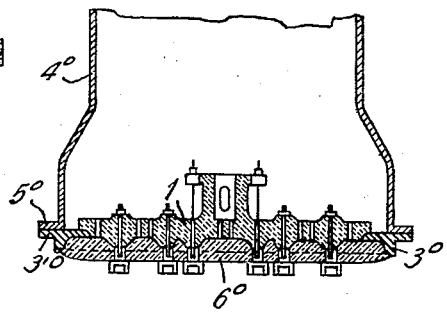
Fig. 13
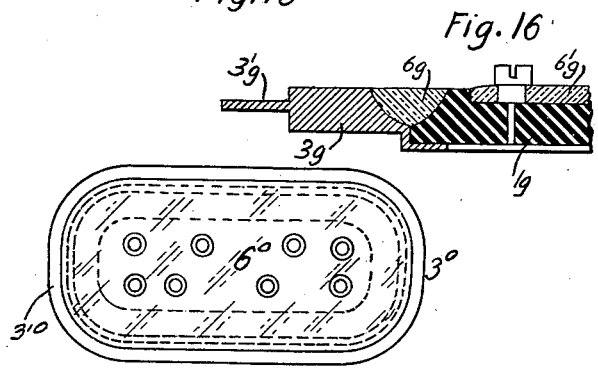
Fig. 16
Fig. 14
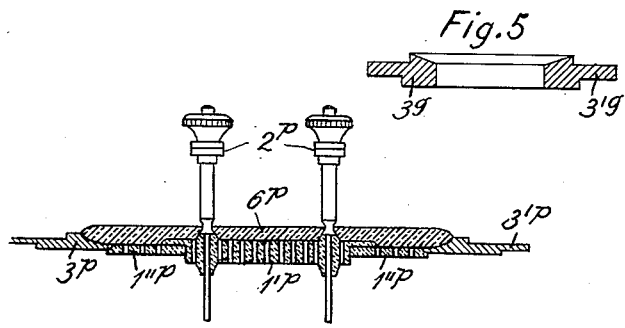
Fig. 5
Fig. 15
*Inventor:*
*Hans Schedel*
by R.C. Hapgood
*Attorney*

Patented May 28, 1940

2,202,469

UNITED STATES PATENT OFFICE 2,202,469

ELECTRIC DISCHARGE VESSEL

Hans Schedel, Stuttgart, Germany, assignor, by mesne assignments, to Erich F. Huth G. m. b. H., Berlin, Germany, a company Application August 10, 1937, Serial No. 158,437
In Germany August 10, 1936

12 Claims. (Cl. 250—27.5)

The invention relates to electric discharge vessels or tubes of the kind having an insulating cover carrying the electrode system.

If the bulb of such vessels is of glass no special difficulty arises in uniting it with a ceramic cover.

In order to provide a metal bulb with a ceramic cover it has been proposed to interconnect the two with the aid of a metallic intermediate member of cylindrical or similar shape. This intermediate member is first fastened to the ceramic body by means of glass poured thereon in a molten condition to form a seal when it solidifies, and is then united with the metal bulb by soldering or welding after the ceramic body has been provided with the electrode system. In order to protect the solidified glass seal from the sudden change of temperature produced by the soldering or welding operation, the said intermediate member is so shaped as to elongate as far as possible the path along which the heat active at the soldering or welding spot can reach the glass seal. This, however, wastes space and does not prevent strains in the glass seal.

In discharge vessels as provided by the invention such intermediate member is an annular metal disc that projects beyond the edge of the ceramic body, as will be understood from the following description, reference being had to the accompanying drawings in which several embodiments of the invention are shown by way of example. In these drawings Fig. 1 is a cross-section in an axial plane of one embodiment of my invention, only a portion of the bulb or vessel being indicated and the electrode structure being left out;

Fig. 2 is a cross-section of a modified cover illustrating only the insulating member, annular member or flange and the glass seal or the like;

Fig. 3 is a cross-section in axial plane of still another modification of the invention illustrating not only a cover but a bulb or vessel as well as the electrode structure;

Fig. 4 is a cross-section similar to Fig. 2 of a further modification;

Fig. 5 is a cross-section of a modified annular member that may be used in applying my invention to a discharge tube;

Fig. 6 is a cross-section of still another modification of the annular member with part of the seal;

Fig. 7 is a cross-section similar to Fig. 5 of a further modification of the annular member;

Fig. 8 is a cross-section of a modification illustrating portions of the annular member, insulating member and seal;

Fig. 9 is a cross-section of a modification illustrating the annular member, insulating member, seal, portion of the vessel and the point at which a flame may be applied to the flange of the annular member;

Fig. 10 illustrates in vertical cross-section still another method of attaching the flange of the annular member to the vessel of the discharge tube;

Fig. 11 is a cross-section of the annular member, insulating member, and seal;

Fig. 12 is a cross-section of a further modification of the annular member;

Fig. 13 is a cross-section of a modification of my cover;

Fig. 14 is a plane view of the structure shown in Fig. 13;

Fig. 15 is a cross-section of a modified cover; and

Fig. 16 is a cross section of the annular member, insulating member and seal showing a modification of the seal.

In the arrangement illustrated in Figure 1 reference numeral 1 denotes a ceramic disk, 3 an intermediate member in the form of a flat metal ring which is soldered or welded to a flange 5 of the metal bulb 4; 6 is a glass seal by which the ceramic disk 1 and the metal body 3 are joined to one another.

As shown in Fig. 2, member 3d may have an upturned edge portion 8d to retain the glass or metal flux which is poured on body 1d to form the seal 6d.

In the arrangement represented in Fig. 3 member 3e is formed with a step 9e over which the seal 6e, owing to its surface tension, will not flow off.

In the arrangement according to Fig. 4 member 3f has a cup-shaped centre portion to receive the seal 6f. The inside of this centre portion has a hyperbolic cross-section indicated at 10f. Owing to the cup-shape of the member 3f the glass or metal flux intended to form the seal 6f may be poured on body 1f that may be preliminarily heated. A circumferential flange 3'f of the member 3f serves to fasten it to the bulb.

The member 3g shown in Fig. 5 is so shaped that it can be cut from sheet metal by punching.

The member 3h represented in Fig. 6 has an annular centering projection 11h by means of which it may be seated in the opening of the bulb of the discharge tube.

The members 3, i and j illustrated in Figs. 7 and 8 have a cup-shaped centre portion the inside of which forms two hyperbolic parts separated from each other by a circular edge 12i.

In the arrangement according to Fig. 9 the bulb 4k is of glass and flange 3'k of the member 3k is so thin-walled that a flange 13k will unite it with the edge of the bulb 4k without the centre portion of the member 3k becoming heated too much.

In accordance with Fig. 10 flange 3'l may be bent to contact with the glass bulb 4l laterally and may then be united therewith by the action of a flame 13l.

As shown in Fig. 11, member 3m may be of such thickness between its flange 3'm and the seal 6m that the heat which serves to solder or weld flange 3'm and bulb 4m to one another shall not be detrimental to seal 6m. Fig. 11 also shows that this seal, which may be of glass or metal, need not cover the entire body 1m but may cover only the edge thereof.

In the arrangement represented in Fig. 12 flange 3'n is provided with a layer 14n of a hard solder. In this way relatively low temperatures are employed in welding the flanges 3, 5 and 3e, 5e (Figs. 1 and 3) to each other.

Fig. 13 shows three electrode-systems carried on a single body 1o. The cover piece 1o, 3o, 6o is of an oval shape, as will be seen from Fig. 14.

The cover piece illustrated in Fig. 15 is for large metallic discharge vessels, such as transmitting tubes, Braun tubes, X-ray tubes, and large valve tubes. It comprises a ceramic centre portion 1'p and an annular ceramic part 1''p surrounding this, the ceramic material of part 1'p being different from that of part 1''p. Member 3p may be cut from sheet metal by punching.

In Fig. 16 is shown a modification of the structure shown in Fig. 11. Member 3q is of such a size that the heat used to solder or weld flange 3'q and bulb 4 to one another will not be detrimental to seal 6q. Seal 6q is used to join insulating body 1q to annular member 3q whereas seal 6'q, which may be of a different type of material or glass from that used at 6q, covers the insulating body 1q.

In all the constructions here disclosed member 3 may be of a nickel or copper alloy.

In the same manner as the ceramic body 1 may be provided with bores or hollows 7, covered by the seal 6, member 3 also may have such bores or hollows provided it is covered by the seal. The cover piece 1, 3, 6 thus may be made to form a sort of disc-shaped mesh-structure which is to a high degree free of strains and on account of its small thickness is suitable for discharge vessels of any kind.

The seal 6 may be arranged in two parts, each consisting of a glass different from the glass of which the other part is made, one of these parts covering the body 1 and the other covering body 1 and member 3 at the junction of the two.

What is claimed is:

1. An electric discharge vessel having in combination with a bulb, a cover comprising an insulating body, a metal annular flange projecting beyond the edge of said insulating body and fastened to said bulb, and a fusible seal which covers both said insulating body and all but a circumferential zone of said flange.

2. A discharge vessel according to claim 1, wherein said flange forms a pocket for the seal.

3. A discharge vessel according to claim 1, wherein a portion of said flange forms a pocket for the seal and a circumferential rim projects beyond the pocket.

4. A discharge vessel according to claim 1, wherein the flange has a cup-shaped centre portion whose inside is of a hyperbolic curvature.

5. A discharge vessel according to claim 1, wherein the flange has a cup-shaped centre portion whose inside is of a hyperbolic curvature and provided with concentric edges.

6. A discharge vessel according to claim 1, wherein the circumferential portion of the annular flange is thin-walled.

7. A discharge vessel according to claim 1, wherein the annular flange is reduced in thickness where it contacts with the insulating body and is of reduced thickness also along its outer edge.

8. A discharge vessel according to claim 1, wherein the circumferential zone of the annular flange is united to the bulb by hard solder.

9. A discharge vessel according to claim 1, wherein the annular flange is of enlarged thickness between its circumference and the seal.

10. A discharge vessel according to claim 1, wherein the circumferential zone of the annular flange is bent, thin-walled and secured to the outside of the bulb.

11. A discharge vessel according to claim 1, wherein the insulating body is only in part covered by the seal.

12. A discharge vessel according to claim 1, wherein the seal is divided in two parts each of which is of a different kind of glass, one of these parts covering the insulating body and the other covering this body and the annular flange at the joint of the two.

HANS SCHEDEL.